United States Patent
Hofinger (10) Patent No.: US 11,389,897 B2
(45) Date of Patent: Jul. 19, 2022

(54) METHOD FOR ENGRAVING, MARKING AND/OR INSCRIBING A WORKPIECE USING A LASER PLOTTER, AND LASER PLOTTER HEREFOR

(71) Applicant: Trotec Laser GmbH, Wels (AT)

(72) Inventor: Andreas Hofinger, Michaelnbach (AT)

(73) Assignee: Trodat GmbH, Wels (AT)

( * ) Notice: Subject to any disclaimer, the term of this patent is extended or adjusted under 35 U.S.C. 154(b) by 500 days.

(21) Appl. No.: 16/338,585

(22) PCT Filed: Sep. 21, 2017

(86) PCT No.: PCT/AT2017/060237
§ 371 (c)(1),
(2) Date: Apr. 1, 2019

(87) PCT Pub. No.: WO2018/064692
PCT Pub. Date: Apr. 12, 2018

(65) Prior Publication Data
US 2020/0038996 A1 Feb. 6, 2020

(30) Foreign Application Priority Data
Oct. 6, 2016 (AT) .............................. A 50902/2016

(51) Int. Cl.
*B23K 26/08* (2014.01)
*B23K 26/352* (2014.01)
(Continued)

(52) U.S. Cl.
CPC ........ *B23K 26/0869* (2013.01); *B23K 26/355* (2018.08); *B23K 26/3568* (2018.08); *B23K 26/36* (2013.01); *B44C 1/228* (2013.01)

(58) Field of Classification Search
CPC .............. B23K 26/0869; B23K 26/355; B23K 26/3568; B23K 26/36; B44C 1/228
(Continued)

(56) References Cited

U.S. PATENT DOCUMENTS 454,499 A 6/1891 Ryer
973,556 A 10/1910 Peterson
(Continued)

FOREIGN PATENT DOCUMENTS

AT 501318 11/2006
AT A50017/2014 1/2014
(Continued)

OTHER PUBLICATIONS

Advisory Action for U.S. Appl. No. 29/567,666 dated May 29, 2018.
(Continued)

*Primary Examiner* — Jimmy Chou
(74) *Attorney, Agent, or Firm* — Kowert, Hood, Munyon, Ranakin & Goetzel, P.C.; Gareth M. Sampson (57) ABSTRACT

In some embodiments, a method includes engraving, marking and/or inscribing a workpiece using a laser plotter. In said method, in a housing of the laser plotter, one, preferably more, in particular two laser sources in the form of lasers have an effect preferably alternating on the workpiece to be processed. The workpiece is laid in a defined manner on a processing table and a laser beam emitted from the beam source (4) is transmitted to at least one focusing unit via deflection elements and the laser beam is diverted toward the workpiece and focused for processing. The workpiece, in particular the position of the work piece in relation to the laser beam, is controlled by means of software running in a control unit, such that the workpiece is processed line by line by the displacement of a carriage. A sequence control
(Continued)

adapted to the quality of the engraving in which a defined ratio of a spot variable to the line distance and an engraving controller of the lines to be processed is determined and/or carried out by the control unit and the focusing unit on the carriage is controlled corresponding to the defined parameters of the sequence control.

14 Claims, 3 Drawing Sheets

(51) Int. Cl.
*B23K 26/36* (2014.01)
*B44C 1/22* (2006.01)

(58) Field of Classification Search
USPC .................................... 219/121.67, 121.68
See application file for complete search history.

(56) References Cited

U.S. PATENT DOCUMENTS

| | | | |
|---|---|---|---|
| D331,418 S | 12/1992 | Winston | |
| D359,504 S | 6/1995 | Stefanski | |
| D367,879 S | 3/1996 | Smith | |
| D387,800 S | 12/1997 | Daw | |
| 5,694,844 A | 12/1997 | Taira | |
| D389,175 S | 1/1998 | Imamaki | |
| 5,727,467 A | 3/1998 | Skopek | |
| 5,768,992 A | 6/1998 | Daw et al. | |
| D400,566 S | 11/1998 | Schreiberhuber | |
| 5,850,787 A | 12/1998 | Daw | |
| 5,906,760 A * | 5/1999 | Robb | B08B 15/00 219/121.84 |
| 5,971,130 A | 10/1999 | Nakamura | |
| D417,464 S | 12/1999 | Skopek | |
| 6,067,905 A | 5/2000 | Faber | |
| D451,944 S | 12/2001 | Lipkin | |
| 6,672,187 B2 * | 1/2004 | Alsten | B26D 5/00 347/157 |
| 6,732,649 B1 | 5/2004 | Wall et al. | |
| 6,772,661 B1 * | 8/2004 | Mikkelsen | B26D 5/00 347/157 |
| 6,813,999 B2 | 11/2004 | Treml | |
| 6,834,584 B1 | 12/2004 | MacNeil | |
| 6,892,638 B2 | 5/2005 | Sculler | |
| 7,069,852 B2 | 7/2006 | Zindl | |
| D538,328 S | 3/2007 | Faber | |
| D540,848 S | 4/2007 | Faber | |
| D542,335 S | 5/2007 | Faber | |
| D542,835 S | 5/2007 | Faber | |
| 7,389,727 B2 | 6/2008 | Faber | |
| D588,187 S | 3/2009 | Shih | |
| 7,520,221 B2 | 4/2009 | Ameshofer | |
| D618,274 S | 6/2010 | Faber | |
| 7,743,703 B2 | 6/2010 | Ameshofer | |
| 7,853,353 B1 | 12/2010 | Hagen et al. | |
| 7,877,909 B1 | 2/2011 | Hagen et al. | |
| 7,894,935 B1 | 2/2011 | Hagen et al. | |
| D645,121 S | 9/2011 | Fukasawa | |
| 8,050,796 B1 | 11/2011 | Hagen et al. | |
| D668,714 S | 10/2012 | Zindl | |
| D677,322 S | 3/2013 | Zindl | |
| 8,402,890 B2 | 3/2013 | Faber | |
| 8,408,126 B2 | 4/2013 | Faber | |
| 8,413,357 B1 | 4/2013 | Hagen et al. | |
| 9,227,450 B2 | 1/2016 | Faber | |
| 9,333,784 B2 | 5/2016 | Faber et al. | |
| 9,354,630 B2 | 5/2016 | Sukhman | |
| 9,475,326 B2 | 10/2016 | Petersen | |
| 9,735,561 B2 | 8/2017 | Schwarz et al. | |
| D803,307 S | 11/2017 | Riegler et al. | |
| 9,895,919 B2 | 2/2018 | Zehetner et al. | |
| D820,350 S | 6/2018 | Riegler et al. | |
| D823,378 S | 7/2018 | Riegler et al. | |
| D847,899 S | 5/2019 | Riegler et al. | |
| 10,376,992 B2 * | 8/2019 | Hildebrand | B23K 26/0622 |
| 10,456,868 B2 | 10/2019 | Pinot et al. | |
| 10,898,973 B2 * | 1/2021 | Lewicki | B23K 26/0869 |
| 2001/0049669 A1 | 12/2001 | Ito et al. | |
| 2002/0144578 A1 * | 10/2002 | Mikkelsen | B26D 5/00 83/13 |
| 2003/0052105 A1 * | 3/2003 | Nagano | B29C 64/277 219/121.83 |
| 2003/0150343 A1 | 8/2003 | Koneczny | |
| 2004/0040943 A1 * | 3/2004 | Lundberg | B44B 3/009 219/121.68 |
| 2005/0066828 A1 | 3/2005 | Wei | |
| 2005/0205537 A1 * | 9/2005 | Penz | B23K 26/0613 219/121.72 |
| 2006/0000374 A1 | 1/2006 | Faber | |
| 2006/0000376 A1 | 1/2006 | Faber et al. | |
| 2006/0162596 A1 | 7/2006 | Faber | |
| 2006/0185539 A1 | 8/2006 | Faber | |
| 2007/0272099 A1 | 11/2007 | Pointl | |
| 2008/0087180 A1 | 4/2008 | Ameshofer | |
| 2009/0057284 A1 * | 3/2009 | Fukuda | B23K 26/0608 219/121.72 |
| 2009/0255427 A1 | 10/2009 | Faber | |
| 2009/0301327 A1 | 12/2009 | Nelson | |
| 2009/0314751 A1 * | 12/2009 | Manens | H01L 31/03921 219/121.69 |
| 2010/0031835 A1 | 2/2010 | Faber | |
| 2010/0263561 A1 | 10/2010 | Faber | |
| 2011/0017716 A1 * | 1/2011 | Rumsby | H05K 3/0026 219/121.72 |
| 2011/0108531 A1 * | 5/2011 | Stokes | B23K 26/40 219/121.69 |
| 2011/0277647 A1 | 11/2011 | Zindl | |
| 2011/0313561 A1 | 12/2011 | Lee | |
| 2013/0114114 A1 * | 5/2013 | Fazeny | B23K 26/361 358/3.29 |
| 2013/0291744 A1 | 11/2013 | Anthony | |
| 2014/0014634 A1 * | 1/2014 | Liu | B23K 26/361 219/121.68 |
| 2014/0175067 A1 * | 6/2014 | Reichenbach | B23K 26/364 219/121.61 |
| 2015/0181033 A1 | 6/2015 | Keller | |
| 2015/0360323 A1 * | 12/2015 | Fazeny | B26D 5/005 219/121.72 |
| 2016/0158888 A1 * | 6/2016 | Liu | B23K 26/361 219/121.68 |
| 2016/0325381 A1 | 11/2016 | Pinot et al. | |
| 2016/0361934 A1 | 12/2016 | Riegler et al. | |
| 2016/0361935 A1 | 12/2016 | Sillipp et al. | |
| 2016/0361936 A1 | 12/2016 | Zehetner et al. | |
| 2016/0368297 A1 | 12/2016 | Scharinger et al. | |
| 2019/0299690 A1 | 10/2019 | Leibezeder et al. | |

FOREIGN PATENT DOCUMENTS

| | | |
|---|---|---|
| AT | A50473/2015 | 6/2015 |
| AT | A50474/2015 | 6/2015 |
| AT | A50475/2015 | 6/2015 |
| AT | A50478/2015 | 6/2015 |
| CA | 2717256 | 11/2011 |
| CN | 301153224 | 3/2010 |
| CN | 304057436 | 2/2017 |
| CN | 304057437 | 2/2017 |
| DE | 1654769 | 4/1953 |
| DE | 202010007577 U | 8/2010 |
| DE | 102014210611 | 12/2015 |
| EM | 001922865-0001 | 2/2012 |
| EM | 002716431-0001 | 1/2017 |
| EM | 002716431-0011 | 1/2017 |
| EM | 002904854-0007 | 1/2017 |
| EP | 0459969 | 12/1991 |
| EP | 0804344 B1 | 9/1998 |
| EP | 2384283 B1 | 11/2011 |
| EP | 2591921 B1 | 5/2013 |
| EP | 2594406 | 5/2013 |
| JP | 2008042032 | 2/2008 |
| JP | D1546014 | 3/2016 |

(56) References Cited

FOREIGN PATENT DOCUMENTS

| WO | 1999064246 | 12/1999 |
|---|---|---|
| WO | 2004085110 | 10/2004 |
| WO | 2006029422 | 3/2006 |
| WO | 2006079129 | 8/2006 |
| WO | 2006079131 | 8/2006 |
| WO | 2010085828 | 8/2010 |
| WO | 2011056345 | 5/2011 |
| WO | 2011151604 | 12/2011 |
| WO | 2014113833 | 7/2014 |
| WO | 2014/172738 A1 | 10/2014 |
| WO | 2014172738 | 10/2014 |
| WO | 2015103654 | 7/2015 |
| WO | 2015176089 | 11/2015 |
| WO | 2016/197172 | 12/2016 |
| WO | 2016197170 | 12/2016 |
| WO | 2016197171 | 12/2016 |
| WO | 2016197173 | 12/2016 |
| WO | 2017210711 | 12/2017 |
| WO | 2018064692 | 4/2018 |

OTHER PUBLICATIONS

Non Final Office Action for U.S. Appl. No. 15/177,072 dated Apr. 6, 2018.
Non Final Office Action for U.S. Appl. No. 15/177,078 dated Jun. 14, 2018.
NPL10—Communication for U.S. Appl. No. 29/567,665 faxed on Jan. 3, 2018.
Final Office Action for U.S. Appl. No. 15/177,072 dated Oct. 11, 2017.
Advisory Action for U.S. Appl. No. 15/177,072 dated Dec. 27, 2017.
Final Office Action for U.S. Appl. No. 15/177,078 dated Oct. 20, 2017.
Notice of Allowance for U.S. Appl. No. 15/177,100 dated Oct. 19, 2017.
Co-Pending U.S. Appl. No. 15/177,072 entitled, "Stamping Device and Stamping Insert, Especially as a Replacement Part for a Stamping Device" to Scharinger et al., filed Jun. 8, 2016.
Co-Pending U.S. Appl. No. 15/177,078 entitled, "Stamp and Stamping Insert, Especially as a Replacement Part for a Stamp" to Riegler et al., filed Jun. 8, 2016.
Co-Pending U.S. Appl. No. 15/177,078 entitled, "Stamp and Stamping Insert, Especially as a Replacement Part for a Stamp" to Riegler et al., filed Apr. 27, 2020.
Co-Pending U.S. Appl. No. 15/177,091 entitled, "Stamp, an Ink Pad and a Closure Cap" to Sillipp et al., filed Jun. 8, 2016.
Co-Pending U.S. Appl. No. 15/177,100 entitled, "Stamp and Stamping Insert" to Zehetner et al., filed Jun. 8, 2016.
Co-Pending U.S. Appl. No. 15/110,610 entitled, "Processing System for Multiple Differing Workpieces" to Pinot et al., filed Jul. 8, 2016.
Co-Pending U.S. Appl. No. 16/307,734 entitled: "Drive Unit, Belt Unit, Bridge, Driver and Stamp Therefor" to Leibezeder, et al., filed Dec. 6, 2018.
Notice of Allowance for U.S. Appl. No. 15/177,072 dated Jan. 14, 2020.
Notice of Allowance for U.S. Appl. No. 15/177,078 dated Dec. 27, 2019.
Non-Final Office Action for U.S. Appl. No. 16/859,690 dated Jun. 29, 2020.
Non Final Office Action for U.S. Appl. No. 15/177,091 dated Dec. 26, 2019.
Final Office Action for U.S. Appl. No. 15/177,091 dated Apr. 3, 2020.
Advisory Action for U.S. Appl. No. 15/177,091 dated Jul. 17, 2020.
Co-Pending Design U.S. Appl. No. 29/548,144 entitled, "Hand Stamp" to Riegler et al. filed Dec. 10, 2015.
Co-Pending Design U.S. Appl. No. 29/567,664 entitled, "Hand Stamp" to Riegler et al. filed Jun. 10, 2016.
Co-Pending Design U.S. Appl. No. 29/567,665 entitled, "Stamp Pad" to Riegler et al. filed Jun. 10, 2016.
Co-Pending Design U.S. Appl. No. 29/567,666 entitled, "Hand Stamp" to Riegler et al., filed Jun. 10, 2016.
NPL02—Registered Community Design No. 002716431, registered Community design for hand stamp and pad, Jun. 10, 2015, 86 pages.
NPL03—Written Opinion for PCT/AT2015/050003 dated Sep. 11, 2015. (publication No. WO2015103654).
NPL04—International Search Report for PCT/AT2015/050003 dated Dec. 11, 2015. (publication No. WO2015103654).
NPL05—Registered Community Design No. 002904854, registered Community design for hand stamp and pad, Dec. 10, 2015, 23 pages.
Notice of Allowance for U.S. Appl. No. 29/548,144 dated Mar. 19, 2018.
Notice of Allowance for U.S. Appl. No. 29/567,665 dated Mar. 19, 2018.
Final Office Action for U.S. Appl. No. 29/567,666 dated Feb. 26, 2018.
Advisory Action for U.S. Appl. No. 15/177,078 dated Feb. 21, 2018.
Advisory Office Action for U.S. Appl. No. 15/177,091 dated Jan. 19, 2018.
Non Final Office Action for U.S. Appl. No. 15/177,091 dated Mar. 27, 2018.
Final Office Action for U.S. Appl. No. 15/177,091 dated Oct. 5, 2017.
Final Office Action for U.S. Appl. No. 15/177,078 dated Jan. 28, 2019.
Advisory Action for U.S. Appl. No. 15/177,078 dated Apr. 18, 2019.
Non Final Office Action for U.S. Appl. No. 15/177,078 dated Aug. 9, 2019.
Non Final Office Action for U.S. Appl. No. 15/177,072 dated Apr. 25, 2019.
NPL13—International Search Report for PCT/AT2017/060146 dated Jan. 15, 2019. (publication No. WO02017210711).
NPL15—Written Opinion for PCT/AT2017/060146 dated Jan. 15, 2019. (publication No. WO2017210711).
NPL14—International Preliminary Report on Patentability for PCT/AT2017/060146 completed Sep. 5, 2018. (publication No. WO2017210711).
NPL11—Written Opinion for PCT/AT2017/060237 dated Mar. 23, 2018. (publication No. WO2018064692).
NPL12—International Search Report for PCT/AT2017/060237 dated Mar. 23, 2018. (publication No. WO2018064692).
Non Final Office Action for U.S. Appl. No. 15/177,091 dated May 2, 2019.
Notice of Allowance for U.S. Appl. No. 29/567,666 dated Dec. 12, 2018.
Final Office Action for U.S. Appl. No. 15/177,091 dated Oct. 4, 2018.
Advisory Action for U.S. Appl. No. 15/177,091 dated Dec. 19, 2018.
Notice of Allowance for U.S. Appl. No. 15/110,610 dated Sep. 25, 2018.
Final Office Action for U.S. Appl. No. 15/177,072 dated Sep. 14, 2018.
Advisory Action for U.S. Appl. No. 15/177,072 dated Nov. 23, 2018.
NPL06—Amazon. <URL: https://www.amazon.com/dp/B01MQDH576?psc=1.> Nov. 3, 2016. Self-inking stamp.
NPL07—Amazon. <URL: http:/la.co/3GHpXYC.> Feb. 12, 2013. Self-inking stamp.
NPL08—Amazon. <URL: https://www.amazon.com/Replacement-TRODAT-Printy-I nkingu Stamps/dp/B00FB70JEO/ref=sr_ 1_ 1 ?ie-UTF8&qid=1496770907&sr-8-1 &keywords-Replacement+Ink+Pad.> Feb. 11, 2012. Replacement Ink Pad.
NPL09_Universal Laser Systems, Inc., "The Turnkey Laser Personalization and Identification Program," 2000.
Notice of Allowance for U.S. Appl. No. 29/567,664 dated Jul. 12, 2017.
Non Final Office Action for U.S. Appl. No. 29/567,665 dated Jun. 29, 2017.

(56) References Cited

OTHER PUBLICATIONS

Non Final Office Action for U.S. Appl. No. 29/567,666 dated Jun. 30, 2017.
Non Final Office Action for U.S. Appl. No. 15/177,072 dated Mar. 27, 2017.
Non Final Office Action for U.S. Appl. No. 15/177,078 dated Mar. 31, 2017.
Non Final Office Action for U.S. Appl. No. 15/177,091 dated Mar. 31, 2017.

* cited by examiner

METHOD FOR ENGRAVING, MARKING AND/OR INSCRIBING A WORKPIECE USING A LASER PLOTTER, AND LASER PLOTTER HEREFOR

PRIORITY CLAIM

This application claims priority to International Application No. PCT/AT2017/060237 entitled "METHOD FOR ENGRAVING, MARKING AND/OR INSCRIBING A WORKPIECE USING A LASER PLOTTER, AND LASER PLOTTER HEREFOR" filed on Sep. 21, 2017, which claims priority to Austrian Patent Application No. A509022016 filed on Oct. 6, 2016, all of which is incorporated by reference herein.

BACKGROUND OF THE INVENTION

1. Field of the Invention

The present disclosure generally relates to a method for engraving, marking and/or marking a workpiece with a laser plotter and a laser plotter.

2. Description of the Relevant Art

In laser plotters, the laser light is sharply focused with a focusing lens. An extremely high-powered density is created in the focus of the laser beam, with which materials can be melted or evaporated, engraved, marked or inscribed. In this case, the processing, in particular the engraving, is performed line by line, the first line preferably being processed from left to right and the next following line from right to left and then again the next line from left to right, etc.

Problems with mechanical lines on the engraved image (cf. FIG. 5) are encountered in the laser plotters that are part of prior art. Certain combinations of material, laser source, in particular $CO_2$ lasers or YAG lasers, the set power, the lens used, etc., can lead to irregular vertical lines. These problems occur especially with planar engravings. Special problems occur, for example, when using a fiber laser for an aluminum engraving, a fiber laser for engraving steel or even when using a $CO_2$ laser for engraving acrylic. The reason for the striation is that the actual engraving oscillates around the ideal line, which can not be prevented due to the mechanical structure of the carriage due to the mechanical play, as shown in FIGS. 1 to 6.

The object of the current disclosure is to provide a method and a laser plotter in which the striation is prevented as much as possible when engraving flat objects.

SUMMARY

The present disclosure generally relates to a method for engraving, marking and/or marking a workpiece with a laser plotter and a laser plotter. In said method, in a housing of the laser plotter, one, preferably more, in particular two beam sources in the form of lasers have an effect preferably alternating on the workpieces which are to be processed. The workpiece is laid in a defined manner on a processing table and a laser beam emitted from the beam source is transmitted to at least one focusing unit via deflection elements and the laser beam is diverted by said unit towards the workpiece and focused for processing. The workpiece, in particular the position of the workpiece in relation to the laser beam is controlled by means of software running in a control unit, such that the workpiece is processed line by line by the displacement of a carriage.

The object of the current disclosure is achieved by a method for engraving, marking and/or inscribing a workpiece with a laser plotter, in which the control unit adjusts a sequence control adapted to the quality of the engraving. A defined spot variable is specified for the line distance and an engraving sequence determined for the lines to be processed. The focusing unit is actuated on the carriage in accordance with the defined parameters of the sequence control.

What is advantageous in this case is that the control unit determines and specifies a special sequence control for high quality engraving, in which the frequently occurring slight striation in the engraved image is prevented, and that the processing time is increased only insignificantly.

This is achieved, because the process performed avoids as much as possible that two parallel lines are processed one after the other. The fewer such line by line processing operations which occur in an engraved image, the higher the quality of the engraved image, since the lack of or the low amount of overlaps and free spaces at the lines eliminates striations.

Another advantage is that the user can select the quality such as standard, improved, or highest quality, so that the control unit selects the appropriate sequences. If standard quality is selected, for example, a bidirectional line for line engraving is selected. If improved quality is selected, blocks are specified and two adjacent blocks are processed alternately. Whereas if the highest quality is selected, blocks are defined once again, with all blocks being alternatingly processed one line at a time or pseudorandom blocks being processed.

Measures in which the engraving process is performed block by block in a unidirectional manner, with at least two blocks being processed alternately are preferable. This is achieved because the alternating block processing leads to an engraving that occurs in every direction, which causes the processing time to approximately correspond to the standard line by line consecutive bidirectional engraving sequence. This means that, in the solution according to the present disclosure, the engraving direction changes for each block, so that there are never two lines with different engraving directions in a given block.

Measures in which each block is formed from at least two, in particular four to ten lines is advantageous. This ensures that, depending on the size of the graphs to be produced, the control unit can set the optimum block size, in particular the number of lines, in order to achieve the fastest possible engraving with the best possible quality.

Measures in which, following the complete processing of at least two blocks by the control unit, the next blocks are processed, with the next or pseudorandom blocks being selected for this purpose, are preferable. This guarantees a complete engraving, with the selection of the next blocks being able to influence the heat balance and/or the quality of the engraving.

Measures in which the processing of the lines within the blocks occurs from top to bottom or from bottom to top or pseudo-randomly are advantageous as well. This ensures that the quality can be increased by an appropriate selection of the process, since, depending on the material to be engraved, the corresponding processes can be determined. In some ways, this makes it possible to control the heat introduced to the material, since the temperature increase is lower if there are greater distances between the lines.

Measures in which a line is engraved from left to right or right to left or with a changing engraving direction are advantageous. This ensures that the quality and the material can be optimally taken into account.

Measures in which all the specified blocks are processed from top to bottom, for example, in which every first line of each block and then the second line of each block etc. is engraved, are advantageous as well. This ensures that always the same carriage adjustment is performed between the blocks, so that the carriage adjustment speed can be increased as needed.

Furthermore, the object of the current disclosure is achieved as well by a laser plotter in which the control unit for carrying out the method is formed. It is advantageous in this case that the method according to the current disclosure can be implemented with a commercially available laser plotter, so that the influences that lead to striation can be prevented.

An embodiment in which the control device is formed with a sequence control adapted to the quality of the engraving, in which a defined ratio of the spot variable to the line distance and an engraving sequence of the lines to be processed can be specified or determined, and the focusing unit on the carriage can be controlled according to the defined parameters of the sequence control is advantageous as well. It is characterized in that a special sequence of the engraving can be performed so that overlaps and spaces caused by the oscillating line engraving are reduced or avoided.

Finally, an embodiment is advantageous in which the control device is designed for the processing of blocks. This is achieved by allowing only one engraving direction within a block, but processing, in particular engraving, the workpiece in both engraving directions.

BRIEF DESCRIPTION OF THE DRAWINGS

The invention will now be described in the form of embodiments, but it should be noted that the invention is not limited to the embodiments or solutions that are illustrated and described.

The figures show the following.

DETAILED DESCRIPTION

By way of introduction, it should be noted that the same parts are provided with the same reference signs or the same component names in the various embodiments, and that the disclosures contained in the entire description can, mutatis mutandis, be applied to the same parts with the same reference signs and/or the same component names. Also, location information provided in the description, such as top, bottom, side, etc. refers to the figure described and can, mutatis mutandis, be applied to the new location if a location is changed. In the same way, individual features or combinations of features from the embodiments illustrated and described may represent separate inventive solutions.

Figure 1:
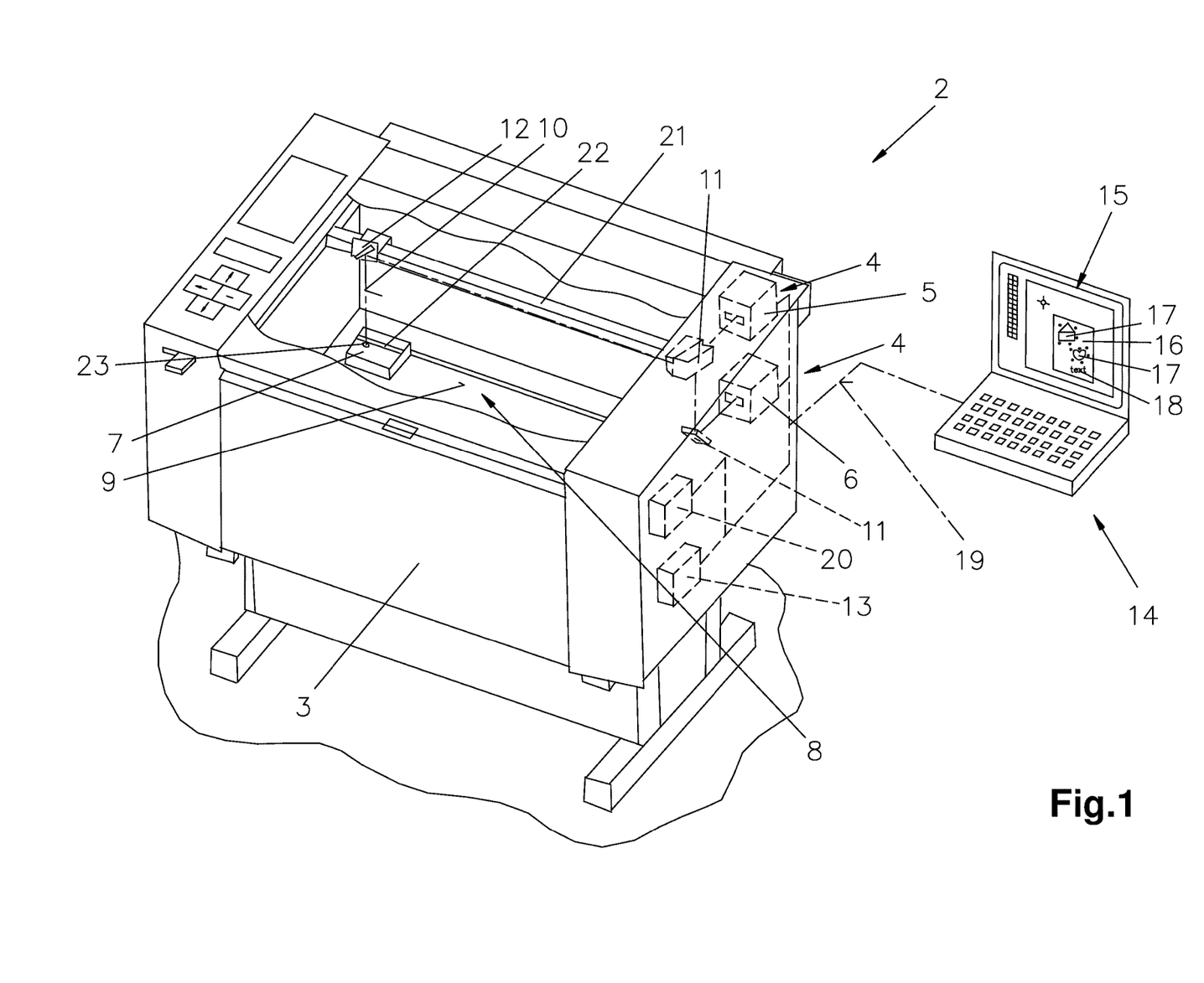
FIG. 1 shows a perspective view of a laser plotter in a simplified, schematic representation.

FIGS. 1 to 4 show an engraving process 1 from prior art, in which the striation problems that occur in a laser plotter 2 are to be illustrated. FIG. 1 shows laser plotter 2 known from the prior art, in which in a housing 3 at least one, in particular two beam sources 4 are arranged and operated in the form of lasers 5, 6. The lasers 5 and 6 preferably act alternately on the workpiece 7 to be processed, wherein the workpiece 7 is positioned in a processing area 8 of the laser plotter 2, in particular on a processing table 9. A laser beam 10 emitted from the beam source 4 is transmitted via deflection elements 11 to at least one movable focusing unit 12, from which the laser beam 10 is deflected in the direction of the workpiece 7 and focused for processing. The control, in particular the position control of the laser beam 10 to the workpiece 7 is performed with software running in a control unit 13. At an external component 14, in particular on a display element 15 in the form of a computer 15 or a control unit, a processing job 16 is created and/or loaded with a graph 17 and/or a text 18, which is transferred to the control unit 13 of the laser plotter 2 via a data link 19. The control unit 13 performs a conversion of the transferred data, in particular the processing job 16 with the graph 17 and/or the text 18, from a stored database 20 for controlling the individual elements of the laser plotter 2.

Figure 2:
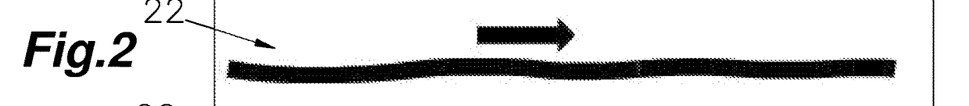
FIG. 2 shows an oscillation of an engraving sequence of a line from left to right in a simplified, schematic representation.
Figures 3, 4:
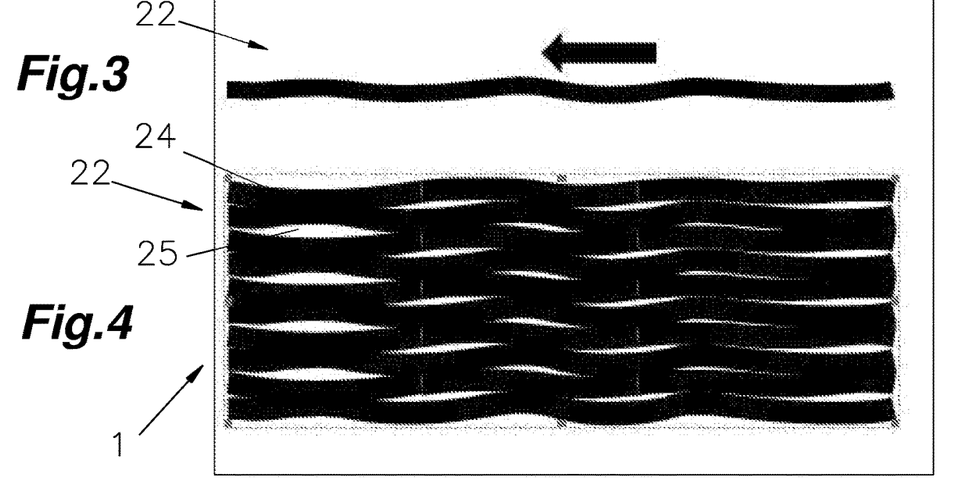
FIG. 3 shows an oscillation of an engraving sequence of a line from right to left in a simplified, schematic representation.
FIG. 4 shows a combination of line-by-line engraving from left to right and right to left from the prior art in a simplified schematic representation.
Figure 5:
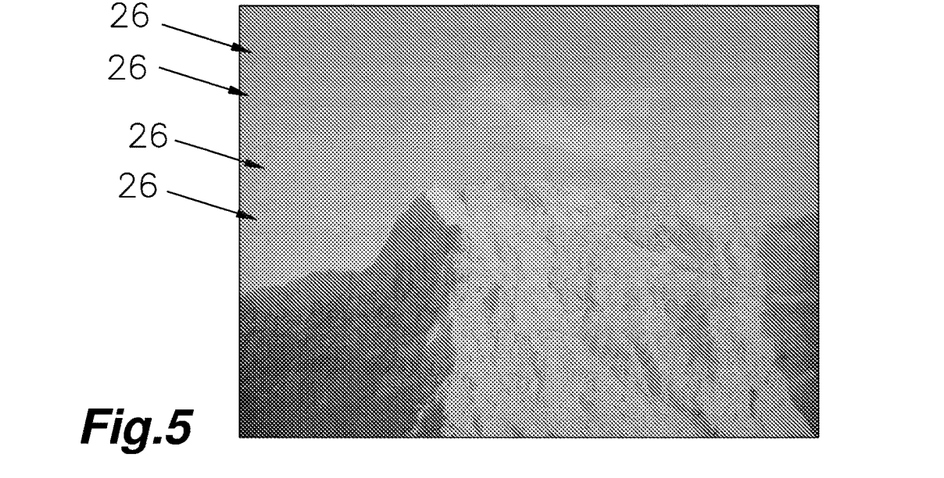
FIG. 5 shows the image from a prior art engraving process that shows the lines.
Figure 6:
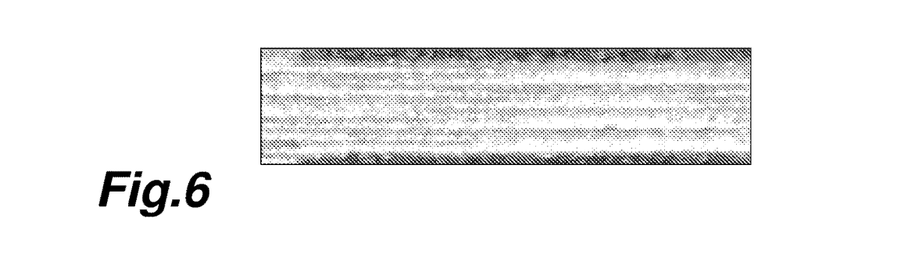
FIG. 6 shows a microscopic enlargement of the engraving according to FIG. 5 to illustrate the overlaps and free spaces occurring during the engraving process from the prior art.

During an engraving process on the workpiece 7, the focusing unit 12 is moved along a carriage 21 so that the laser beam generates a line 22 on the workpiece 7 with a predetermined spot variable 23 of the laser 4 or 5, as shown schematically in FIGS. 2 and 3. Due to the mechanical structure and thus the associated mechanical play, the laser beam 10 or the spot point oscillates around the straight line. In this case, the oscillation occurs from left to right according to FIG. 2, unlike the oscillation from right to left according to FIG. 3, so that a repetitive pattern of overlaps 24 and free spaces 25 occurs in the engraving sequence 1 according to FIG. 4, which is perceived as lines 26 in the engraved image as shown in FIG. 5. FIG. 6 shows a microscopic enlargement of the image engraving of FIG. 5, showing the laser engraving in the form of dark lines which converge in a certain area. As can be seen in the illustrations, in particular FIGS. 4 to 6, there is a repetitive pattern of overlaps 24 and free spaces 25, which are perceived as lines 26.

Another cause is that a laser source expands due to temperature fluctuations, which causes the laser power output to change slightly. This change is not monotonous but shows an oscillation behavior. For engravings that take a long time and that also have large monochrome areas, these fluctuations become visible as lines 26. This is the case in particular when the processed material, i.e. the workpiece 7, behaves non-linearly in the selected area, which means that small fluctuations in the laser power lead to strong fluctuations of the result on the material.

A simple method that avoids lines is to perform a unidirectional engraving so that the oscillation behavior is merged line 22 by line 22 in the same way so that no overlaps 24 or spaces 25 occur. This means that the activated laser plotter 2 activates the laser beam 10 only in one direction, for example from left to right, to form the engraving and that the laser beam 10 is deactivated in the return from right to left, whereupon subsequently an engraving from left to right can take place. For the sake of clarity, it is pointed out that this can also be reversed, of course, i.e. that the laser beam is activated when the focus unit 12 moves from right to left and is deactivated when it moves from left to right.

However, this engraving method has a major disadvantage, namely that the time for the laser engraving is doubled or approximately doubled, since it is possible to use different adjustment speeds, which means that the engraving speed very slow, but the reset can be done very quickly.

According to the invention, in order to avoid the lines 26, it is now provided that, not as it is known from the engraving sequence 1 of the prior art, the lines 22 are processed in a strict order, namely line 22 by line 22, but that, according to the invention, the lines 22 are processed in a alternative sequences depending on the desired correction and/or quality.

In this case, the control unit 13 performs an analysis of the graph 17 and/or text 18 before the start of the engraving process 1 and defines the corresponding parameters such as the spot variable 23, engraving speed, etc. At the same time, the control unit divides the area to be engraved, i.e. the graph 17 and/or text 18, into blocks 27, each block containing a specified number of lines 22 as shown schematically in FIG. 7. In the illustrated embodiment, therefore, the graph 17 shown in FIG. 5 has been divided into a plurality of blocks 27, with only six blocks 27 being shown for purposes of illustration, with each block 27 including four lines 22 each. For the sake of clarity, it should be noted that, of course, more or less lines 22, than four lines 22 shown for illustration purposes, may be included. As can be seen from the engraving sequence 1 according to FIG. 7, the blocks 27 are always engraved in one direction only, i.e. the first block 27 is engraved from left to right, whereas the second block 27 is engraved from right to left, etc. In this case, the engraving starts at the starting point 28, so that the carriage 21 with the focusing unit 12 is positioned accordingly. Whereupon the focusing unit 12 travels along the carriage 21, i.e. from left to right, with the carriage 21 remaining stationary, until the activated laser beam 10 has reached the end of the line 22 thus the first line 22 has been generated. Subsequently, the carriage 21 is now moved to the first line 22 of the second block 27, as shown schematically outside of the engraving sequence 1 by adjusting lines 29 for the carriage 21. After the first line 22 has been produced in the first two blocks 27 in different engraving directions, the carriage 21 with the focusing unit 12 is positioned on the second line 22 of the first block 27 and the process begins again for the second, third and fourth line 22 etc.

Figure 7:
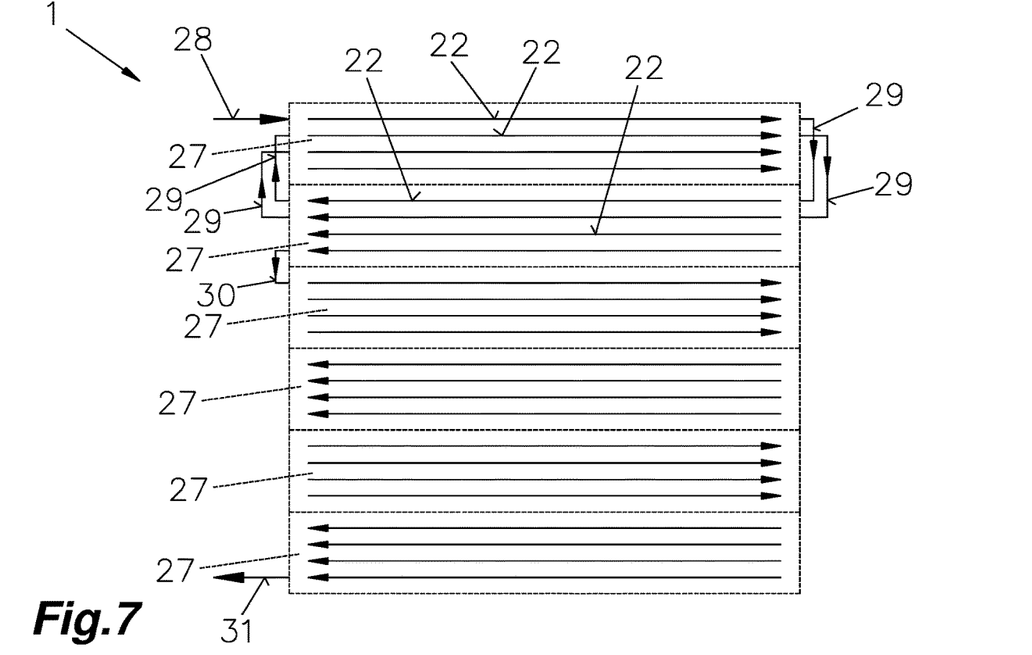
FIG. 7 shows an engraving sequence according to the invention for avoiding the lines with a block-by-block sequence control.

If the last line 22 has been processed in the second block 27, a block change 30 is now carried out, as shown schematically with a block change line, so that the next two blocks 27, namely the third and fourth block 27, are processed in accordance with the sequence described above. It should be mentioned that it is not necessarily the next block 27 that is selected during the block change 30, but that, for example, the next two blocks 27 are skipped and the engraving continues with the sixth and seventh block 27, so that the material of the workpiece 7 to be engraved can cool off. The skipped blocks 27 are processed subsequently or at an appropriate time, so that all blocks 27 were processed at the end of the engraving.

In this engraving sequence 1 shown in FIG. 7, the engraving sequence 1 is performed block-by-block in a unidirectional manner, with always two blocks 27 being alternately processed. The big advantage of this engraving sequence 1 is that the engraving is once more carried out in every direction, i.e. from left to right and from right to left. In this way the engraving only takes slightly longer due to the greater adjustment of the carriage 21, but does not perform the line-by-line engraving sequence 1 known from prior art. As can now be seen in the engraving sequence 1 according to the current disclosure, the overlaps 24 and free spaces 25 leading to the lines 26 are avoided by the block-by-block processing, so that the lines 26 are no longer present in such an engraving.

In the case of block-by-block processing, it is also possible that all defined blocks 27 are processed from top to bottom or vice versa, whereby, for example, every first Line 22 of each block 27 is processed first, whereupon the second line 22 of each block 27, etc. is engraved. It is also possible for the blocks 27 to be selected and processed in a pseudo-random manner (not shown). Here, it is certainly also possible for the lines 22 within the blocks 27 to be processed from top to bottom or from bottom to top or in a pseudo-random manner.

It is therefore possible to say that the current disclosure provides that the control unit 13 specifies and/or determines a sequence control that is adapted to the quality of the engraving in which a defined ratio of a spot variable 23 to the line distance and an engraving sequence 1 of the lines 22 to be processed is carried out. That the focusing unit 12 on the carriage 21 is actuated according to the defined parameters of the sequence control. Hence, due to the size of the spot variable 23 and a line distance that is either set or automatically calculated, the control unit 13 can determine a block size and thus the number of required Blocks 27 can be determine for a given graph 17 or text 18. If, for example, a different ratio of the spot variable 23 or pixel size is used for a higher engraving quality, the line distance between the lines 22 is reduced so that the size of the block 27 is changed and thus more or less blocks 27 are required for the engraving sequence 1. In this case, it is possible for the user to adjust the spot variable 23 and possibly the line distance by means of a parameter, or that corresponding parameters for the spot variable 23 and/or line distance are stored in a memory due to defined quality settings such as standard, improved or high quality, which can be loaded after the selection and used for the analysis.

Figure 8:
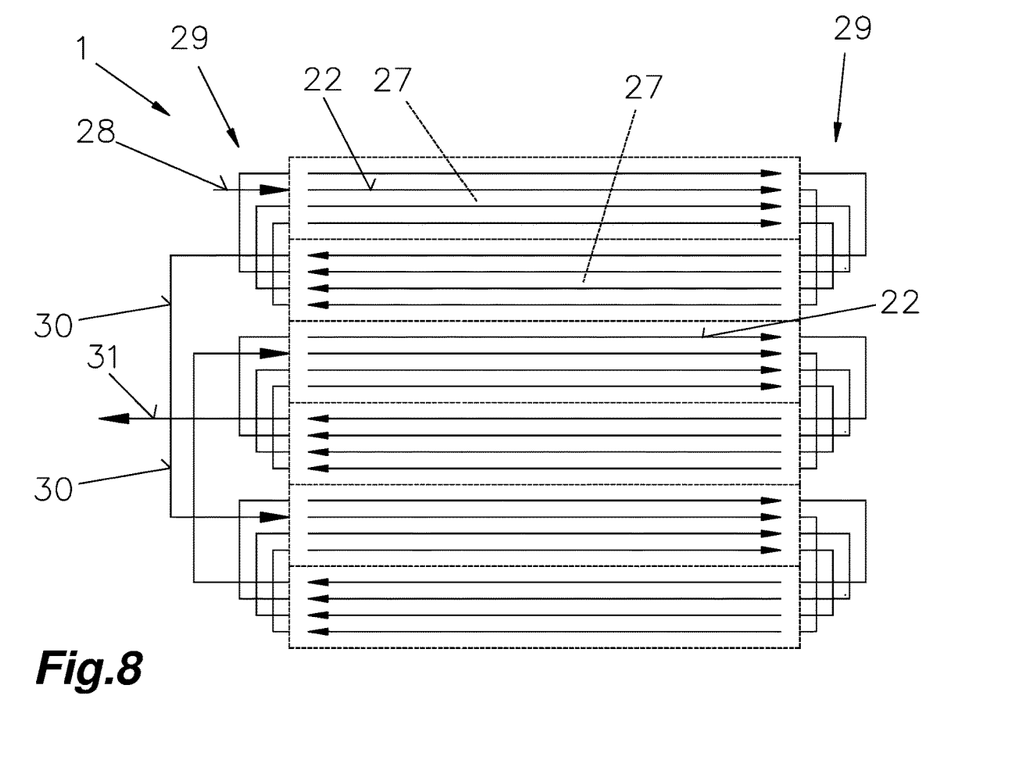
FIG. 8 shows a further exemplary embodiment of a block-by-block engraving sequence according to the invention with a pseudorandom sequence of the blocks and rows.

FIG. 8 shows a pseudorandom sequence for the processing of the lines 22 in the blocks 27, the essential advantage being that in this process two lines 22 are processed consecutively that are never adjacent to each other. The starting point 28 of the engraving from left to right is therefore the second line 22 of the first block 27, whereupon the fourth line 22 of the second block 27 is engraved from right to left. Subsequently, the fourth line 22 of the first block 27, the third line 22 of the second block 27, the third line 22 of the first block, the second line 22 of the second block and from there the first line 22 of the first block 22, whereupon the first line 22 of the second block 27 is engraved as the last line 22. After all lines 22 have been processed, the carriage 21 according to the block change 30 shown returns again to the second line 22 of the next pair of blocks processed, in this pseudorandom sequence to the fifth block 27, so now the blocks 27 five and six are processed. Following this, a switch is performed from the sixth block 26 to the block pair of the blocks 27 three and four, so that the end position 31 in the first line 22 of the fourth block 27 is reached.

Preferably, four to six lines 22 per block 27 have been formed in the different attempts in which the best quality and the fastest possible engraving time is achieved. Thus, by means of the specification of the lines 22 in a block 27, which can be set by the user preferably in the control unit 13 as a parameter, a simple analysis or calculation of the number of required blocks 27 for a graphs 17 to be processed and/or text 18 can be performed. It has been found particularly advantageous that paired two-piece blocks provides very good and high-quality engravings.

In order to avoid the lines 26, it is also possible that a pseudorandom line selection is performed instead of the blocks or within the blocks, thereby ensuring that non-consecutive lines are processed consecutively. In particular the engraving direction left/right must be taken into account, whereby the formation of differently sized unidirectional overlaps 24 and/or free spaces 25, which can make themselves noticeable as horizontal, irregular lines, are avoided.

It is also possible to provide an approach in which, for example, all even lines 22 are processed first, and then all odd lines 22. The appearance of a line may depend on whether the lines 22 above or below were engraved before or after, particularly due to thermal effects, etc. If, for example, all lines 22 of a block 27 are engraved from top to bottom, then each line 22 has a temporal predecessor, and all lines 22 have a temporal successor except the last line 22 of the block 27. This can lead to horizontal, narrow lines 26, triggered by the special position of the last line 22 of each block 27.

Tests have shown that a unidirectional engraving provides for an optimal reduction of vertical lines 26. Vertical lines 26 (not shown) are reduced by mechanical oscillations by a unidirectional or block-by-block unidirectional engraving. In principle, these lines 26 may still be visible in the points of contact of the blocks 27, but with increasing block size, the intensity of the lines will also decrease.

Blocks 27 are zones of successive lines 22, preferably with the same engraving direction, wherein the block size is >=2 lines 22. It is possible that the blocks 27 of different sizes may undergo, for example, an adjustment of the number of lines of the job or engraving, reduction of the periodicity. Periodicity may, in combination with other periodic characteristics of the device or the laser plotter 2, such as belt pitch, encoder resolution, motor torques, etc., lead to Moire effects, with Moire effects typically being understood as wide, horizontal, periodic lines 27.

As already mentioned, it is also possible that the order of the blocks 27 can be changed. For example, all can be completed sequentially (continuous progress, easy for the user to watch) or smaller groups can be prefinished so that ongoing quality control is possible, for example a check of the set laser power. A pseudorandom distribution is possible as well, which provides advantages especially in CO2 laser tubes. CO2 laser tubes can exhibit a heating behavior that causes the laser power to fluctuate around an average. The oscillation period is in the range of minutes. For engravings that take a very long time, these fluctuations can result in horizontal, unevenly wide lines, which are greatly reduced by the pseudorandom distribution.

Also, the sequence within the block 27 may be changed so that, for example, the engraving occurs from top to bottom, which means that from each block, the first, then second line 22 is engraved, or all even, and then all odd or pseudorandom selections are engraved. The appearance of a particular line 22 may depend on whether the line 22 above or below was engraved before or after. If, for example, all the lines of a block are engraved from top to bottom, each line has a temporal predecessor, and all lines except the last one have a temporal successor. This can lead to horizontal, narrow lines caused by the (periodic) special position of the last line 22 of each block, which can be avoided.

It is also possible that a line 22 of the block 26 is engraved multiple times, for example, with first processed line 22 (not necessarily the top line 22) being processed again at a later time as well (especially as the last line 22 within the block 26). Both the first and the (temporally) last line 22 of a block 26 have a special position; this periodicity can result in narrow, horizontal lines. The advantage here is that the locally identical line 22 is processed with the same parameters (speed, direction, . . . ) both times, which is why no artifacts occur within the line 22 (e.g. overlaps due to backlash). This is accompanied by a small loss of time.

However, an approach is possible as well in which overlapping blocks 26 are engraved, i.e. a single line 22 is engraved both from the left and from the right, with only selected parts of the line being processed each time. The line intensity is further reduced, since possible lines 26 no longer appear between n-block 27 and n+1 block 27, but between n-block 27 and the divided line 22, as well as between the divided line 22 and n+block 27, which means that they are spread out and thus less visible over an area that is twice as large. The loss of time is less, but the quality can be slightly poorer.

What is critical for the solution according to the current disclosure is that the control unit 13 determines and/or executes a sequence control of the lines 22 to be processed, which is adapted to the quality of the engraving. In which a defined spot variable 23 to the line distance and an engraving process 1, which can vary as described above, and that the focusing unit 12 is actuated on the carriage 21 according to the defined parameters of the sequence control, so that the striation on the engraved image is avoided or greatly reduced.

As a matter of form, it should finally be pointed out that the engraving process 1 and its components were sometimes shown in an unscaled and/or in an enlarged and/or reduced scale and, above all, only schematically to provide a better understanding.

Furthermore, individual features or combinations of features from the illustrated and described different embodiments may form separate, inventive solutions or solutions according to the invention.

The invention claimed is:

1. A method for engraving, marking and/or inscribing a workpiece, comprising:
processing a workpiece with a laser plotter, in which, in a housing of the laser plotter, at least two beam sources in the form of lasers are used, which act alternately on the workpiece to be processed, wherein the workpiece is laid in a defined manner on a processing table;
transmitting a laser beam emitted alternately from the at least two beam sources to at least one focusing unit via deflection elements, and diverting the laser beam by the focusing unit toward the workpiece and focused for processing;
controlling the position of the workpiece in relation to the laser beam by means of software running through a control unit such that the workpiece is processed line by line by the displacement of a carriage;
adapting a sequence control to the quality of the engraving in which a defined ratio of the size of a spot of the laser beam variable to the line distance and an engraving control of the lines to be processed is determined and/or carried out by the control unit;

controlling the focusing unit on the carriage corresponding to the defined parameters of the sequence control; and performing the engraving sequence block-by-block in a unidirectional manner, with at least two blocks being processed alternately and with the engraving direction changing for each block.

2. The method of claim 1, further comprising performing the engraving sequence block-by-block in a unidirectional manner, wherein in each case at least two blocks are processed alternately.

3. The method of claim 1, further comprising forming each block from at least two to ten lines or four to ten lines.

4. The method of claim 1, further comprising processing the next blocks after the complete processing of the at least two blocks by the control unit, wherein the next blocks or pseudorandom blocks are selected.

5. The method of claim 1, further comprising processing the lines within the blocks from top to bottom or from bottom to top or in a pseudorandom manner.

6. The method of claim 1, further comprising processing a line from left to right or right to left or with changing engraving direction.

7. The method of claim 1, further comprising processing all defined blocks from top to bottom, whereby each first line of each block is processed first, whereupon the second line of each block is engraved.

8. A method for engraving, marking and/or inscribing a workpiece, comprising:

processing a workpiece with a laser plotter, in which, in a housing of the laser plotter, at least two beam sources in the form of lasers are used, which act alternately on the workpiece to be processed, wherein the workpiece is laid in a defined manner on a processing table;

transmitting a laser beam emitted alternately from the at least two beam sources to at least one focusing unit via deflection elements, and diverting the laser beam by the focusing unit toward the workpiece and focused for processing;

controlling the position of the workpiece in relation to the laser beam by means of software running through a control unit such that the workpiece is processed line by line by the displacement of a carriage;

adapting a sequence control to the quality of the engraving in which a defined ratio of the size of a spot of the laser beam variable to the line distance and an engraving control of the lines to be processed is determined and/or carried out by the control unit;

controlling the focusing unit on the carriage corresponding to the defined parameters of the sequence control; and performing the engraving sequence block-by-block in a unidirectional manner, with at least two blocks being processed alternately and with the engraving direction changing for each block.

9. The method of claim 1, further comprising performing the engraving sequence block-by-block in a unidirectional manner, wherein in each case at least two blocks are processed alternately.

10. The method of claim 1, further comprising forming each block from at least two to ten lines or four to ten lines.

11. The method of claim 1, further comprising processing the next blocks after the complete processing of the at least two blocks by the control unit, wherein the next blocks or pseudorandom blocks are selected.

12. The method of claim 1, further comprising processing the lines within the blocks from top to bottom or from bottom to top or in a pseudorandom manner.

13. The method of claim 1, further comprising processing a line from left to right or right to left or with changing engraving direction.

14. The method of claim 1, further comprising processing all defined blocks from top to bottom, whereby each first line of each block is processed first, whereupon the second line of each block is engraved.

\* \* \* \* \*